United States Patent
King

(10) Patent No.: US 9,199,546 B2
(45) Date of Patent: Dec. 1, 2015

(54) AUDIBLE CONFIRMATION OF BATTERY CHARGING IN ELECTRIC VEHICLES

(71) Applicant: Russell W. King, Evans, GA (US)

(72) Inventor: Russell W. King, Evans, GA (US)

(73) Assignee: Club Car, LLC, Evans, GA (US)

( * ) Notice: Subject to any disclaimer, the term of this patent is extended or adjusted under 35 U.S.C. 154(b) by 180 days.

(21) Appl. No.: 13/731,692

(22) Filed: Dec. 31, 2012

(65) Prior Publication Data

US 2013/0241481 A1 Sep. 19, 2013

Related U.S. Application Data

(60) Provisional application No. 61/582,295, filed on Dec. 31, 2011.

(51) Int. Cl.
H02J 7/00 (2006.01)
B60L 11/18 (2006.01)

(52) U.S. Cl.
CPC ......... *B60L 11/1824* (2013.01); *B60L 11/1809* (2013.01); *B60L 11/1816* (2013.01); *H02J 7/0047* (2013.01); *B60L 2250/10* (2013.01); *Y02T 10/7005* (2013.01); *Y02T 90/121* (2013.01); *Y02T 90/14* (2013.01)

(58) Field of Classification Search
CPC ............ B60L 11/1824; B60L 11/1816; B60L 11/1809; B60L 11/14; B60L 2250/10; H02J 7/0047; H02J 7/14; Y02T 10/7088; Y02T 10/7005; Y02T 90/121; Y02T 90/14
USPC ........................... 320/108, 109, 138, 149, 150
See application file for complete search history.

(56) References Cited

U.S. PATENT DOCUMENTS

| 4,456,869 | A | 6/1984 | Schub |
| 4,700,375 | A | 10/1987 | Reed |
| 4,916,438 | A | 4/1990 | Collins et al. |
| 5,202,617 | A | 4/1993 | Nor |
| 5,206,578 | A | 4/1993 | Nor |
| 5,490,370 | A * | 2/1996 | McNair et al. ................. 56/11.9 |
| 5,548,200 | A | 8/1996 | Nor et al. |
| 5,757,595 | A | 5/1998 | Ozawa et al. |
| 5,926,004 | A | 7/1999 | Henze |
| 6,114,833 | A | 9/2000 | Langston et al. |
| 6,157,162 | A | 12/2000 | Hayashi et al. |
| 6,225,776 | B1 | 5/2001 | Chai |
| 6,630,813 | B2 | 10/2003 | Berels et al. |
| 2004/0226801 | A1 | 11/2004 | De Jonge et al. |

(Continued)

OTHER PUBLICATIONS

International Search Report of the International Searching Authority for International PCT Application No. PCT/US2012/072303; Mar. 5, 2013; 2 pages.

(Continued)

*Primary Examiner* — Vuthe Siek
(74) *Attorney, Agent, or Firm* — Taft Stettinius & Hollister LLP

(57) ABSTRACT

An electric vehicle battery recharging system is disclosed that is capable of generating an audible sound to indicate that the battery system of the vehicle is being recharged. The system includes an audible indicator that is connected or otherwise associated with a controller. The controller is configured to actuate the audible indicator in response to a voltage or current of a battery system rising a predetermined amount after recharging is initiated so as to provide audible confirmation to a recharging operator that the battery system is being recharged.

20 Claims, 6 Drawing Sheets

(56) References Cited

U.S. PATENT DOCUMENTS

| | | |
|---|---|---|
| 2007/0212596 A1* | 9/2007 | Nebrigic et al. .............. 429/61 |
| 2008/0150490 A1 | 6/2008 | Koziara et al. |
| 2008/0303480 A1* | 12/2008 | Prutchi et al. ............... 320/108 |
| 2009/0107740 A1 | 4/2009 | Bell et al. |
| 2010/0019718 A1 | 1/2010 | Salasoo et al. |
| 2010/0026477 A1* | 2/2010 | Reynolds et al. ........... 340/441 |
| 2010/0114798 A1 | 5/2010 | Sirton |
| 2010/0245095 A1* | 9/2010 | Harrell ....................... 340/601 |
| 2010/0320964 A1 | 12/2010 | Lathrop et al. |
| 2011/0025267 A1 | 2/2011 | Kamen et al. |
| 2011/0175569 A1 | 7/2011 | Austin |

OTHER PUBLICATIONS

Written Opinion of the International Searching Authority for International PCT Application No. PCT/US2012/072303; Mar. 5, 2013; 8 pages.

* cited by examiner

AUDIBLE CONFIRMATION OF BATTERY CHARGING IN ELECTRIC VEHICLES

PRIORITY CLAIM

This application claims priority to and the benefit of U.S. Provisional Application No. 61/582,295 filed Dec. 31, 2011.

BACKGROUND

Embodiments relate to electric vehicles and the charging and recharging thereof. More particularly, but not exclusively, the embodiments relates to electric vehicles of the type which have traction batteries that need to be periodically recharged by connection to an external power source.

SUMMARY

In one aspect, the present invention provides an improvement on the way existing fleets of electric golf carts being recharged, such as a fleet of golf carts, battery recharging system that monitors for a rise in the voltage of an electric vehicle's battery after an attendant has connected the power cord to the vehicle charging port and then generates an audible confirmation once a sufficient rise in the battery voltage has been detected.

In one aspect, the present invention involves an improved battery recharging system that monitors a vehicle's battery after an attendant has successfully connected the vehicle to its charging system and then generates an audible confirmation once a sufficient rise in the battery voltage has been detected, thereby providing an audible confirmation that battery recharging is actually occurring.

DESCRIPTION OF THE DRAWINGS

Features of the invention will be better understood from the following detailed description when considered in reference to the accompanying drawings, in which.

DETAILED DESCRIPTION

Figure 1:
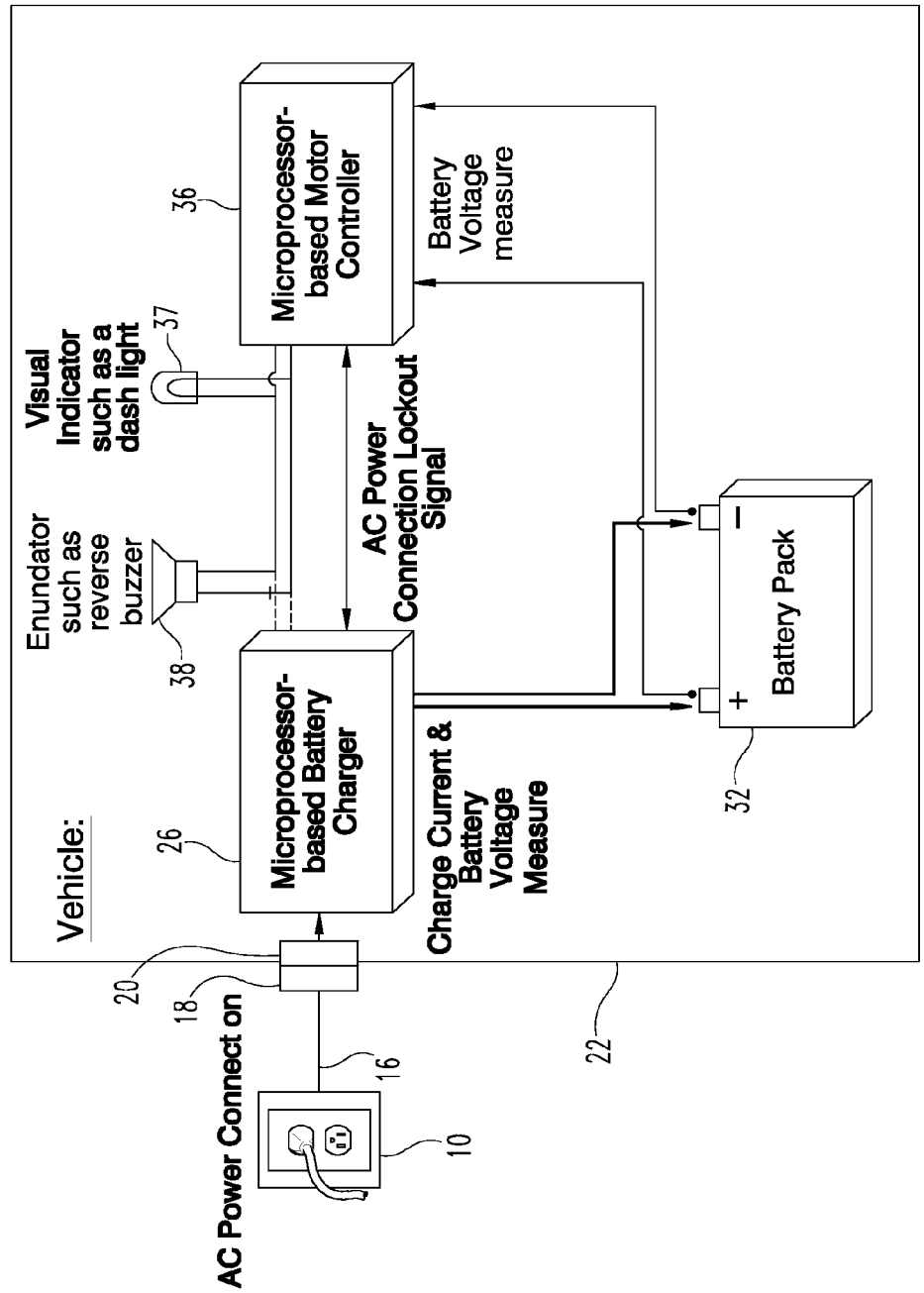
FIG. 1 is a functional block diagram representing a vehicle according to an embodiment.

FIG. 1 is a functional block diagram representing a vehicle according to an embodiment. In an embodiment, a vehicle 22 includes a rechargeable battery system 32 and an electric motor (not shown) and may be any variety of vehicle, such as a golf cart, utility vehicle, forklift, passenger vehicle or the like. In an embodiment, the battery system 32 serves as the sole source of the power to propel the vehicle, as in a traction battery pack for golf carts and utility vehicles, while in others the battery system 32 functions as a supplemental power source, as with a hybrid drive. In an embodiment, the battery system 32 can be a single battery, a bank of batteries, a bank of batteries with a dedicated controller, or the like.

Vehicle 22 includes a battery charging system 26. Charging system 26 can be configured to recharge the battery system 32. The charging system 26 can be a microprocessor based, solid state device, discrete electronics, or the like. Charging system 26 can be configured as an on-board charging system and can be connected to an external power source 10 by a charging cable. For example, charging cable 16 can have a connector 18 that mates with a corresponding connector 20 on the vehicle 22 to connect charging system 26 to an external AC power source 10. In an embodiment, the making of this connection serves to commence the recharging of the battery system 32 by the system 26.

The charging system 26 is coupled to a controller 36. The controller 36 can be a motor controller for the vehicle. During operation of the vehicle 22, the battery pack 32 can be configured to deliver power to the electric motor as directed by the motor controller 36, for example, in response to received inputs (e.g. the operator depressing the accelerator).

In an embodiment, the controller 36 can be configured to actuate an audible indicator 38. For example, when a transmission control or other equivalent directional control of the vehicle 22 is placed into a reverse setting, the controller 36 can be configured to actuate the audible indicator 38 to generate a beep. The controller 36 can be configured to actuate the same audible indicator 38 when the vehicle 22 is being recharged.

For example, a user can connect the connectors 18 and 20, to supply power to the vehicle 22 from the power source 10. The power source 10 can be any variety of power sources. For example, the power source 10 can be an alternating current (AC) power source. However, in other embodiments, the power source 10 can be a direct current (DC) power source.

The charging system 26 can be configured to generate a power connection signal. For example, the power connection signal can be a lockout signal used to prevent the vehicle 22 from moving, engaging the motor, or the like while connected to a power source 10. The controller 36 can be configured to receive the power connection signal from charging system 26 and actuate the audible indicator 38 in response. In an embodiment, an audible signal can be generated when a connection is made. Accordingly, a user can receive positive feedback regarding the connection.

In addition or alternatively, an audible signal can be generated by the audible indicator 38 in response to a state of charging. As will be described in further detail below, a variety of techniques can be used to determine if the battery system is charging.

In an embodiment, the charging status can be used in combination with the connection status. For example, the connection signal can trigger an operation of determining if charging is occurring. As a result, the audible signal can be generated when the connection is made and charging has begun. In contrast, if power is restored after a power failure, an entire fleet of vehicles may begin charging. An audible signal from each vehicle 22 when charging resumes may not be desirable. Accordingly, the connection status can be used to filter changes in charging state from not-charging or discharging states to a charging state. However, in an embodiment, the audible signal can be generated based on the charging status without regard to the connection status.

Although the controller 36 has been used as an example of a system configured to actuate the audible indicator 38, the audible indicator can be coupled to the charging system 26 as well. Thus, the charging system can be configured to actuate the audible indicator 38. In a particular example, the charging system 38 can be configured to actuate a audible indicator 38 that is normally used to indicate that the vehicle is in a reverse mode. That is, an additional audible indicator 38 can, but need not be present as the existing audible indicator can be used.

Although the same audible signal can be used in both reverse and charging, in an embodiment, a different audible signal can be generated in association with charging than when the vehicle 22 is in reverse. For example, in reverse, a typical periodic beeping can occur. In contrast, the audible signal associated with charging can be a faster sequence of beeps that does not repeat. In another example, a different pitch can be used. In another example, a synthesized signal can be used. Any audible signal that can be distinguishable from a reverse signal can be used.

Although an audible indicator 38 has been described in association with charging, the audible signal can, but need not be the only technique used to communicate charging status. For example, a visual indicator 37 can also indicate the status. That is, the audible indication can be supplemental to other indications. However, in a busy environment, a visual indication may be overlooked, require direct line of sight, or the like for positive confirmation of charging.

Figure 2:
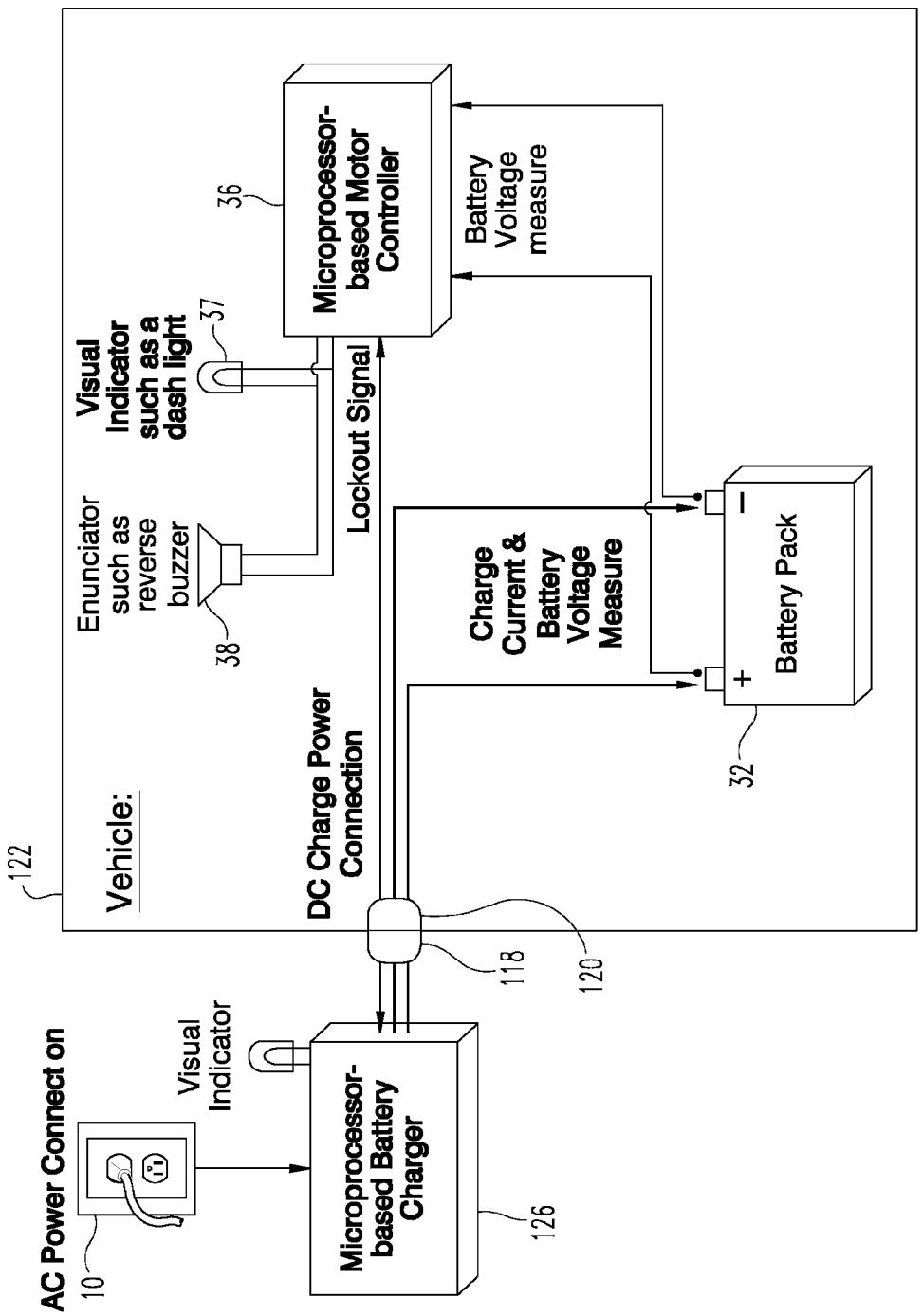
FIG. 2 is a functional block diagram representing another vehicle according to an embodiment.

FIG. 2 is a functional block diagram representing another vehicle according to an embodiment. In this embodiment, the controller 36 is coupled to the audible indicator 38 and the battery system 32. The controller 36 can similarly be configured to determine a charging status of the battery system 32.

However, in this embodiment, the vehicle 122 is configured to be coupled to an external charging system 126. The external charging system 126 can be similarly coupled to a power source 10. A connector 118 coupled to the charging system 126 can be connected to a connector 120 of the vehicle 122.

In an embodiment, the controller 36 can be configured to receive a connection signal, such as a lockout signal, from the external charging system 126. For example, a dedicated contact of the connectors 118 and 120 and corresponding conductors can propagate the connection signal to the controller 36.

However, in another embodiment, the controller 36 can be configured to determine if a connection is made. For example, a switch can be used to detect if the connector 118 is mated with the connector 120. In another example, electrical components within the connectors and/or the charging system 126 can affect an electrical parameter of a circuit coupled to the controller 36. For example, a resistor in the connector 118 can change a voltage of a voltage divider coupled to the controller 36. The controller 36 can sense the voltage and make a determination whether a connection is made based on the voltage.

In particular, in an embodiment, the vehicle 122 does not include the charging system 126. Even if the external charging system 126 has determined that charging has begun, a fault can still occur. Furthermore, any signal, whether audible, visual, or otherwise, that is generated by the charging system 126 is conceptually associated with the charging system 126. In contrast, as an on-board audible indicator 38 can be used to convey charging status, an indicator associated with the particular vehicle being charged can focus a user's attention to that vehicle, rather than a physically separate external charging system 126.

Figure 3:
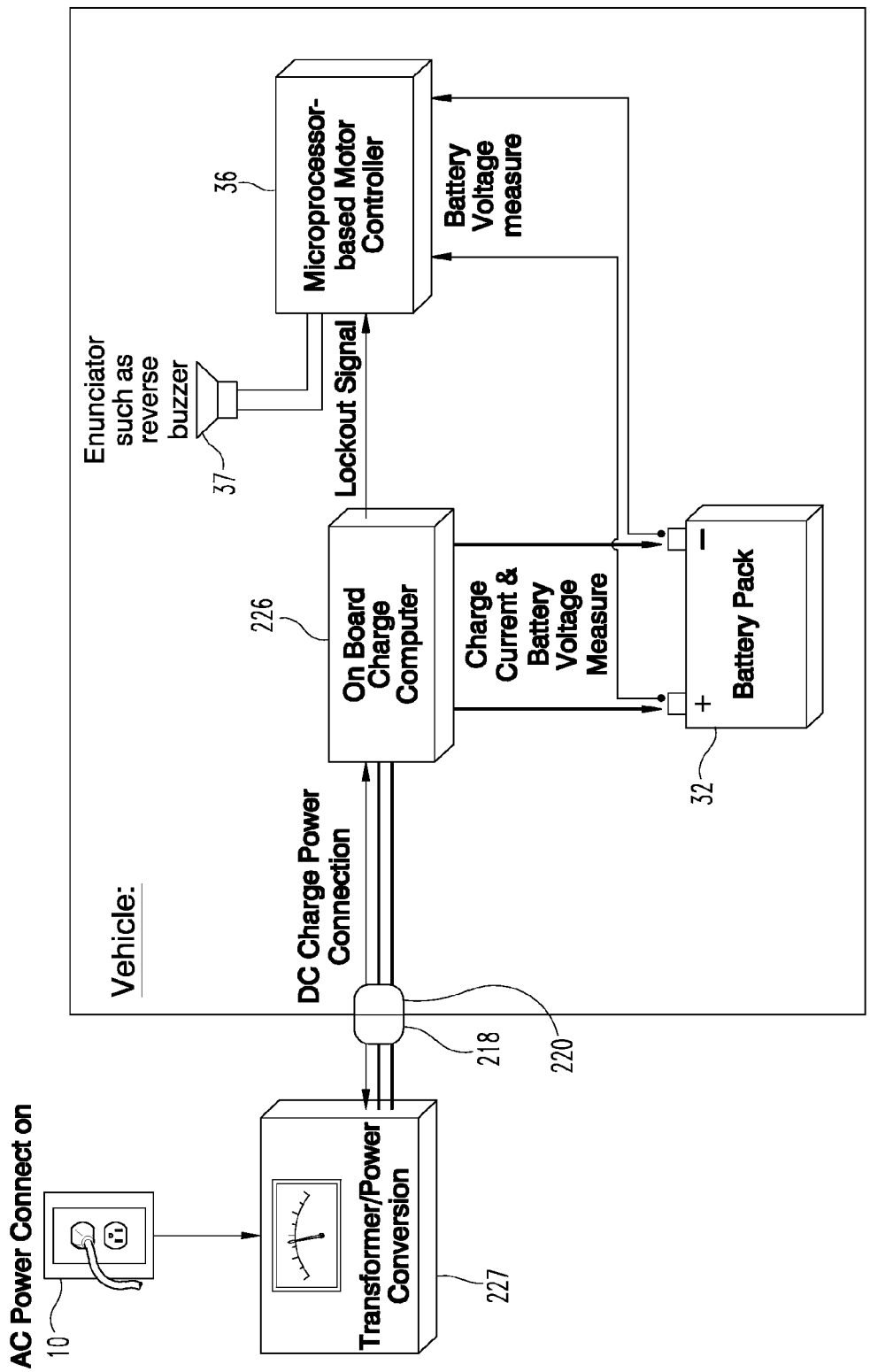
FIG. 3 is a functional block diagram representing another vehicle according to an embodiment.

FIG. 3 is a functional block diagram representing another vehicle according to an embodiment. In an embodiment, the charging components can be distributed between external components 227 and on-board components 226. A connection signal can be generated in a variety of ways. For example, a lockout signal can still be transmitted from the on-board components 226. Alternatively, the lockout signal can be merely propagated through or around the on-board components 226 from the external components 227.

Figure 4:
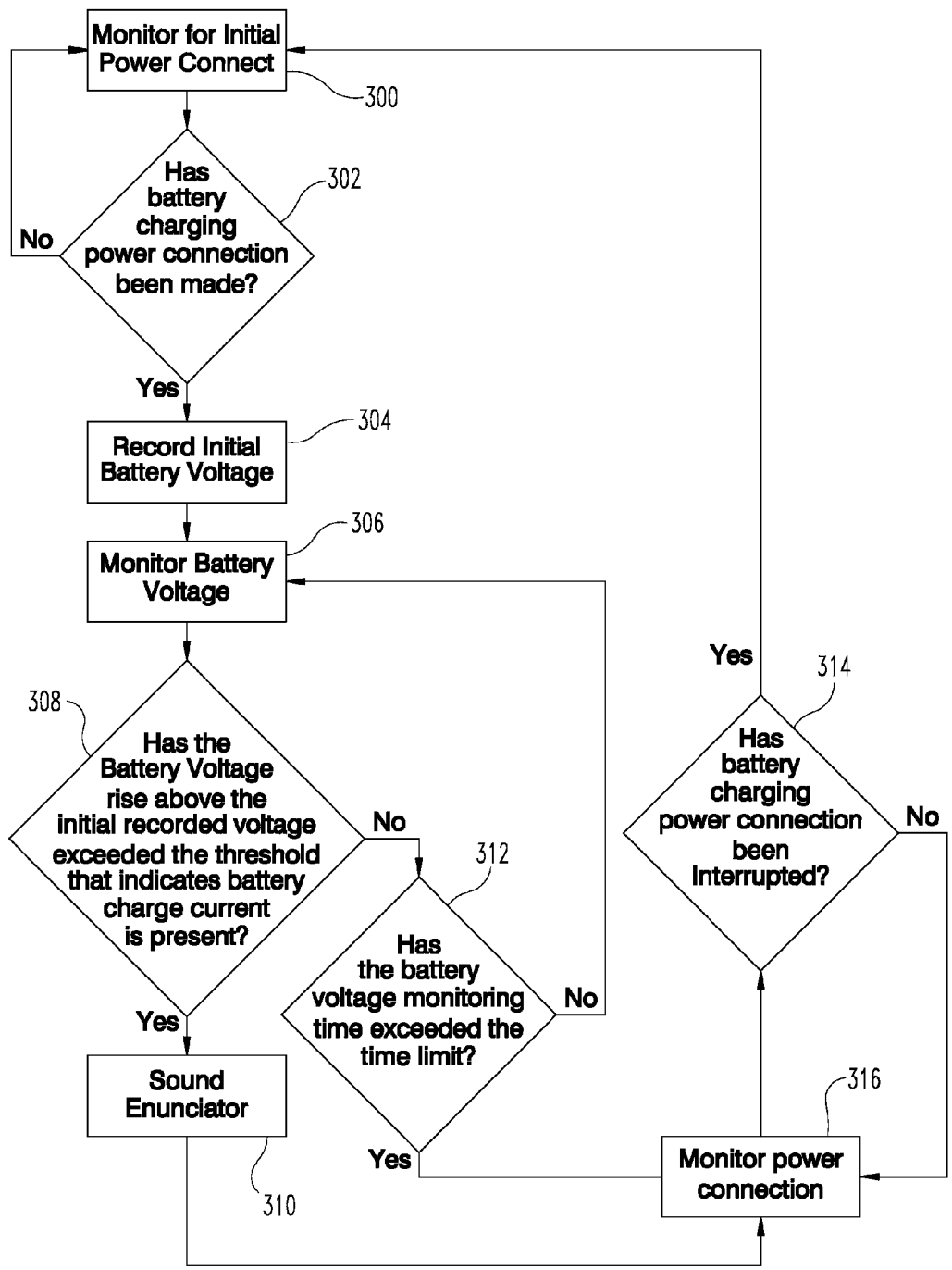
FIG. 4 is a flowchart illustrating an operation of a charging system according to an embodiment.

FIG. 4 is a flowchart illustrating an operation of a charging system according to an embodiment. In 300, an initial power connection is monitored. For example, a lockout signal, connection signal, switch, change in an electrical parameter, or the like as described above, can be used to determine if a connection has been made in 302. In one form, the controllers 26, 36 include software or applications that are configured to receive input signals, as set forth below, and take appropriate actions in response to those signals.

In this embodiment, voltage can be used to determine a charging state. In 304, an initial voltage is recorded. The voltage can be stored in a memory, an energy storage device, or the like.

In 306, the battery voltage is monitored. The battery voltage is compared with the recorded voltage in 308. In particular, the current battery voltage can be compared to determine if the current voltage has exceeded the initial voltage by a threshold. For example, a 0.8 volt threshold can be used for a 48 V 100 Ah battery.

In an embodiment, the voltage threshold can be determined based on a particular time period. For example, the 0.8 V described above can correspond to a voltage increase that occurs in approximately 5-20 seconds for the associated battery system and charging system. Accordingly, the audible signal can be generated after approximately 5-20 seconds. For other batteries, battery systems, charging systems, or the like, a different voltage can be used.

If the voltage rise is detected in 308, in 310 the audible signal can be generated. If not, a time limit is checked in 312 to determine if a threshold time has passed. If not, the battery voltage is again monitored in 306 and compared in 308.

If the time has passed, processing can further continue in 316. In general, The monitoring for the increase in battery voltage to generate the audible signal does not occur for further operations. However, if the power connection is interrupted, in 314, the monitoring for the voltage rise can begin again in 300. For example, if power has been lost, but the connection has not been disconnected, the voltage comparison does not begin again when power is restored. In contrast, if the power connection is disconnected then reconnected, the monitoring for the increase in the battery voltage can resume.

Although voltage has been used as an example of a technique to determine if the battery system is being charged, other techniques can be used. For example, a current monitor can sense that an initial current flow to the battery that is substantially zero, or indicates that the battery system is discharging. A current flow into the battery can indicate that the battery is charging. For example, a current threshold can be used to determine if the battery system is charging.

A time period can similarly be used as described above. For example, if the audible signal can be generated after a time period during which the current flow into the battery system meets or exceeds the threshold. In another example, an amount of energy transferred to the battery can be calculated, approximated, or the like. The audible signal can be generated in response to the amount of energy. Any parameter that changes based on the charging of a battery or battery system can be used in generated an audible signal.

Although a charging state has been described as associated with the audible signal, in an embodiment, the state of interest is that actual charging state of a battery. That is, whether the battery voltage is increasing, a supplied current is decreasing, an amount of energy has been transferred, or the like. As the monitored state used for determining whether charging is occurring is conceptually removed from the actual energy storage device, the potential for unresolved faults can increase. However, in other embodiments, the exact battery parameters can, but need not be used. Rather, proxies for the battery parameters, such as communicated sensed values, can be used. Furthermore, in an embodiment, parameters that are somewhat removed from the actual charging can be used, even if particular faults may not be detected. For example, a current flowing into an on-board charging system can be used.

Figure 5:
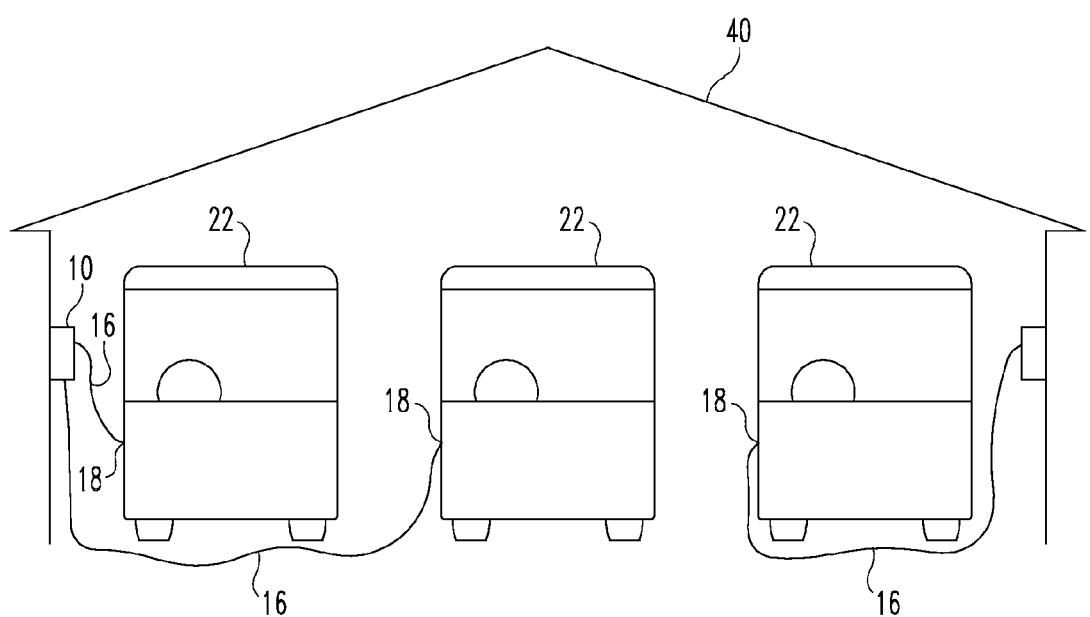
FIG. 5 is a schematic depiction of a fleet of electric vehicles being recharged according to an embodiment.

FIG. 5 is a schematic depiction of a fleet of electric vehicles being recharged according to an embodiment. In an embodiment, multiple vehicles 22 can be charged in a location, such as a building 40. The building 40 can be a garage, shed, awning, or the like. A power source 10 can be coupled to the vehicles through cables 16 and connectors 18 coupled to corresponding connectors on the vehicles 22.

In operation, a user may be connecting many vehicles 22 to the power source 10. During the hustle and bustle of a busy day, the user may neglect to verify that a visual indicator has illuminated, indicating that a particular vehicle 22 is charging. With the audible indication, a user can move on to connecting the next vehicle 22 to the power source 10 and, while finding the cable 16 for that next vehicle 22, hear the audible indication confirming charging of the previous vehicle 22.

Figure 6:
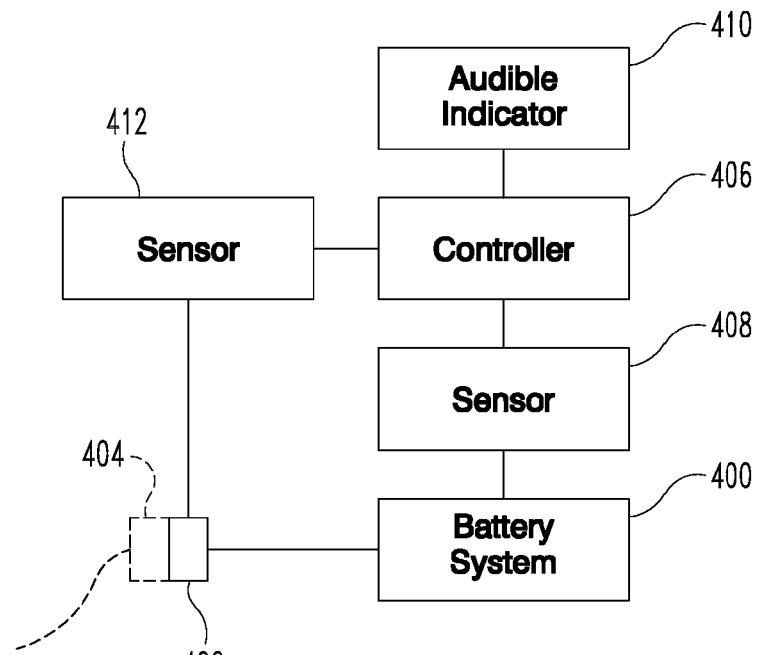
FIG. 6 is a block diagram of a vehicle charging system according to an embodiment.

FIG. 6 is a block diagram of a vehicle charging system according to an embodiment. Multiple ways can be used to sense how the connection is made by connectors 402 and 404. For example, the controller 406 can be coupled to a sensor 412. The sensor 412 can be a switch, circuit, such as the voltage divider described above, or the like.

The controller 406 can be coupled to the sensor 408. The sensor 408 can be a voltage sensor, current sensor, output of the battery system 400, or the like. Accordingly, the controller 406 can be configured to sense an electrical parameter associated with the battery system 400 to determine if the battery system 400 is charging.

The controller 406 can be any controller of the vehicle. For example, the controller 406 can be a dedicated, stand-alone controller. In another example, the controller can be part of the motor controller for the vehicle. In another example, the controller 406 can be part of a user interface for the vehicle.

Regardless, the controller 406 can be configured to generate an audible signal through the audible indicator 410. Although a direct connection has been illustrated, the controller 406 can cause the audible signal to be generated through intervening systems. For example, the controller 406 can communicate to a motor controller to cause the motor controller to generate the audible signal.

Figure 7:
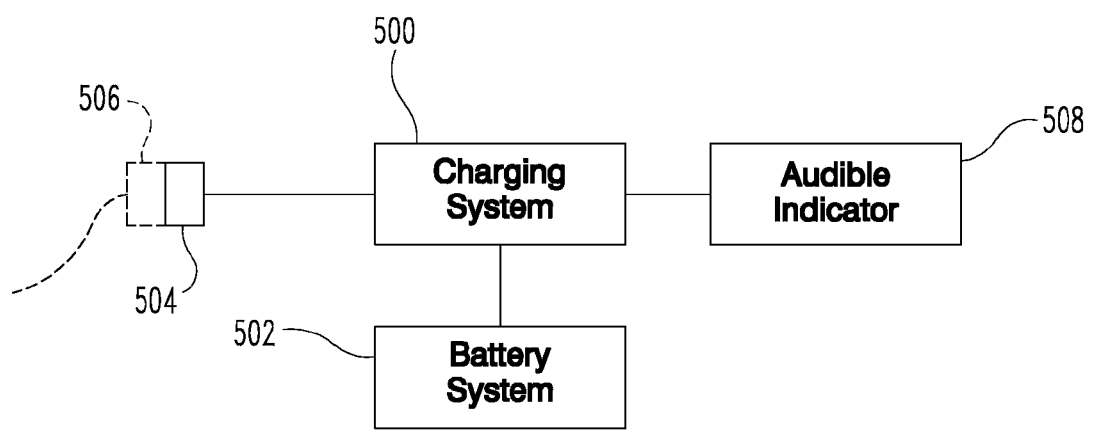
FIG. 7 is a block diagram of a vehicle charging system according to an embodiment.

FIG. 7 is a block diagram of a vehicle charging system according to an embodiment. The charging system 500 for the battery system 502 itself can be configured to determine if the connection is made between connectors 504 and 506, and control the actuation of the audible indicator 508. The charging system 500 can be a complete charging system that is configured to receive only power. In another example, the charging system 500 can be a part of system with onboard and external components. Regardless, the on-board charging system 500 can make a determination to actuate the audible indicator 508 as described above. That is, in an embodiment, the controller described above can be part of the charging system 500.

An embodiment includes a computer-readable medium storing computer-readable code that when executed on a computer, causes the computer to perform the various techniques described above. In a particular example, an existing controller coupled to a audible indicator, such as a reverse audible indicator, can be retrofit with new firmware, software, or the like. Accordingly, the associated vehicle can be configured to generate an audible signal associated with charging as described above.

Although a lockout signal has been described above in association with determining if a power connection is made, the lockout signal is but one example of a signal that can be used to determine if the power connection is made. As described above, a variety of other signals can be used in combination with or separate from a lockout signal.

Although particular sequences of operations have been described above, in other embodiments, the sequences can occur as desired.

Although particular embodiments have been described above, the scope of the following claims is not limited to these embodiments. Various modifications, changes, combinations, substitution of equivalents, or the like can be made within the scope of the following claims.

What is claimed is:

1. An electric vehicle battery recharging system comprising:
   an audible indicator; and
   a controller;
   wherein the controller is configured to actuate the audible indicator in response to a voltage of a battery system rising a predetermined amount from an initial voltage value after recharging is initiated so as to provide audible confirmation to a recharging operator that the battery system is being recharged, wherein the predetermined amount is based on a predetermined time period of between 5 and 20 seconds for the voltage to rise from the initial voltage value by the predetermined amount.

2. The recharging system of claim 1, wherein the battery system voltage rise is determined based on a baseline established upon connection of a recharging power cord to a vehicle.

3. The recharging system of claim 2, wherein the baseline is established while a traction motor controller of the vehicle is in a lockout state that prevents accidental movement of the vehicle.

4. The recharging system of claim 1, wherein the predetermined amount is 0.8 volts.

5. The recharging system of claim 1, wherein the audible indicator is on the vehicle.

6. The recharging system of claim 1, wherein the audible indicator is also used to provide an audible indication when the vehicle is in reverse.

7. The recharging system of claim 1, further comprising at least one visual indicator for displaying charging information to the recharging operator.

8. An electric vehicle comprising:
   a rechargeable battery;
   a connection port for connection to a recharging power cable;
   an audible indicator; and
   a controller configured to actuate the audible indicator in response to a predetermined increase in a voltage value of the rechargeable battery from an initial voltage value after the recharging power cable has been attached to the vehicle connection port to indicate the rechargeable battery is recharging, wherein the predetermined increase in the voltage value is based on a predetermined time period of between 5 and 20 seconds for the predetermined increase in the voltage value from the initial voltage value to occur.

9. The electric vehicle of claim 8, wherein the controller is further configured to control a traction motor of the vehicle such that while recharging the vehicle is prevented from moving.

10. The electric vehicle of claim 8, wherein the controller is further configured to generate a lockout signal when the recharging power cable is attached to the connection port that is directed to a motor controller.

11. The electric vehicle of claim 8, wherein the controller is further configured to generate a traction motor lockout signal when the recharging power cable is attached to the vehicle connection port.

12. An electric vehicle battery recharging system comprising:
   a connection port operable to receive a recharging power cable;
   a first controller connected with said connection port for generating a charging current that is applied to a battery system, wherein said controller includes an application that takes an initial reading associated with said battery system; and
   an audible indicator associated with said controller, wherein said controller includes a second application that monitors a reading associated with said battery system until said reading reaches a predetermined threshold above said initial reading, wherein the predetermined threshold is based on a predetermined time period of between 5 and 20 seconds for the reading to reach the predetermined threshold from the initial reading, wherein once said reading reaches said predetermined threshold said controller sends a signal to said audible indicator causing said audible indicator to generate an audible sound indicating the battery system is charging.

13. The electric vehicle battery recharging system of claim 12, wherein said initial reading comprises an initial voltage reading.

14. The electric vehicle battery recharging system of claim 13, wherein said predetermined threshold comprises a predetermined voltage reading above said initial voltage reading and the predetermined voltage reading is 0.8 volts above the initial voltage reading.

15. The electric vehicle battery recharging system of claim 12, wherein said initial reading comprises an initial current reading.

16. The electric vehicle battery recharging system of claim 15, wherein said predetermined threshold comprises a predetermined current reading above said initial current reading.

17. The electric vehicle battery recharging system of claim 12, further comprising a second controller connected with said first controller for controlling a traction motor.

18. The electric vehicle battery recharging system of claim 17, wherein said first controller includes an application configured to generate a lockout signal that is sent to said second controller that prevents said vehicle from moving while said battery system is recharging.

19. The electric vehicle battery recharging system of claim 12, further comprising an optical indicator connected with said first controller, wherein once said reading reaches said predetermined threshold said controller sends a signal to said optical indicator causing said optical indicator to generate a visible indicator.

20. The electric vehicle battery recharging system of claim 12, wherein said audible sound is distinct from a sound generated by said vehicle when said vehicle is placed in reverse.

* * * * *